(12) United States Patent
Dougherty et al.

(10) Patent No.: US 7,069,541 B2
(45) Date of Patent: Jun. 27, 2006

(54) SYSTEM AND METHOD FOR A WEB-BASED APPLICATION DEVELOPMENT AND DEPLOYMENT TRACKING TOOL

(75) Inventors: Charles B. Dougherty, Buford, GA (US); Christopher Payne, Cumming, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 692 days.

(21) Appl. No.: 10/084,948

(22) Filed: Mar. 1, 2002

(65) Prior Publication Data

US 2004/0261053 A1    Dec. 23, 2004

(51) Int. Cl.
*G06F 9/44* (2006.01)
*G06F 9/445* (2006.01)

(52) U.S. Cl. ............ 717/122; 717/121; 717/123; 717/124; 717/177

(58) Field of Classification Search ........ 717/168–178, 717/100–124; 709/200–224, 201–232
See application file for complete search history.

(56) References Cited

U.S. PATENT DOCUMENTS

| | | | | |
|---|---|---|---|---|
| 4,951,192 A | * | 8/1990 | Chase et al. | 717/149 |
| 5,995,757 A | * | 11/1999 | Amberg et al. | 717/175 |
| 6,167,567 A | * | 12/2000 | Chiles et al. | 717/173 |
| 6,324,578 B1 | * | 11/2001 | Cox et al. | 709/223 |
| 6,510,466 B1 | * | 1/2003 | Cox et al. | 709/229 |
| 6,516,337 B1 | * | 2/2003 | Tripp et al. | 709/202 |
| 2002/0040469 A1 | * | 4/2002 | Pramberger | |

* cited by examiner

*Primary Examiner*—Tuan Dam
*Assistant Examiner*—Chuck Kendall
(74) *Attorney, Agent, or Firm*—Walters & Zimmerman; Jennifer Pearson Medlin; Todd Mitchem

(57) ABSTRACT

A tool for automating management of software development and deployment processes. The tool is made up of a series of lists or databases tracking various information related to the software releases and individual software components making up the releases. The tool includes a user interface for receiving build requests from users. When a build request is received from a user, the tool checks a user list to verify that the user's role allows the request, and the tool executes the build script associated with the component, and updates a status associated with the build request. Builds are automatically sent to target nodes in pre-determined environments for testing or for operational deployment. The tool stores the code in the correct directory locations and install the code for use. The tool further allows tester to grade software and provide feedback and test results to the developers and configuration managers for further development.

20 Claims, 23 Drawing Sheets

| 9 SOFTWARE DEVELOPMENT AND DEPLOYMENT TOOL | 13 |
|---|---|

| BUILD | DEPLOY | CM ADMIN | APPROVE | BUILD STATUS | MODIFY PROFILE |
|---|---|---|---|---|---|
| | 15 | 8 | 10 | 12 | HELP · LOG OUT |

Logged in as:
Christopher Payne

Build Request Status
Last Updated: Mon Nov 12 09:26:38 EST 2001

| Req # | Component | Version | Requestor | Status | Environment | Date Submitted | Comments |
|---|---|---|---|---|---|---|---|
| 2342 | wdtoolWeb | 1.0.1 | Christopher Payne | Rejected by Systest | CMCommonDev | 2001-11-09 13:14:47.0 | |
| 2335 | wdtoolWeb | 1.0.1 | root root | In Sandbox | CMSandbox | 2001-11-05 12:34:03.0 | Installed in Sandbox (ganesh) |
| 2265 | wdtoolCnt | 1.0.1 | Chuck Dougherty | READY install on Common Dev | CMCommonDev | 2001-09-06 09:06:38.0 | |
| 2295 | wdtoolCnt | 1.0.1 | Chuck Dougherty | Rejected by CM | CMCommonDev | 2001-09-06 09:03:15.0 | |
| 2294 | wdtoolCnt | 1.0.1 | Chuck Dougherty | Rejected by CM | CMCommonDev | 2001-09-06 08:58:50.0 | |
| 2293 | wdtoolCnt | 1.0.1 | Chuck Dougherty | Rejected by CM | CMCommonDev | 2001-09-06 08:50:59.0 | |
| 2292 | wdtoolCnt | 1.0.1 | Chuck Dougherty | Rejected by CM | CMCommonDev | 2001-09-06 08:21:03.0 | |
| 2283 | wdtoolWeb | 1.0.1 | root root | In Sandbox | CMSandbox | 2001-08-22 10:18:22.0 | Installed in Sandbox (ganesh) |
| 2187 | wdtoolWeb | 1.0.1 | Chuck Dougherty | Rejected by Systest | CMSandbox | 2001-08-22 10:16:25.0 | |
| 2265 | wdtoolCnt | 1.0.1 | root root | In Sandbox | CMSandbox | 2001-08-22 10:17:22.0 | Installed in Sandbox (ganesh) |

FIG. 2

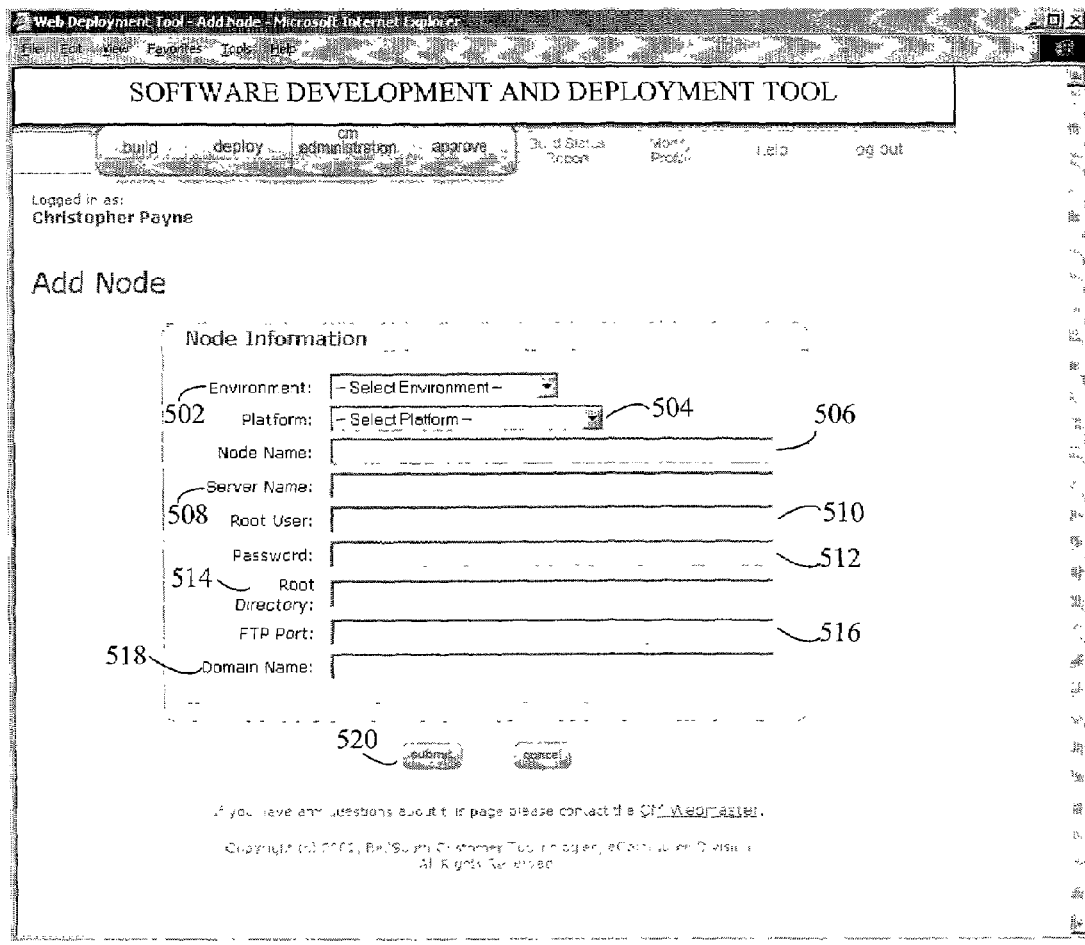
FIG. 5
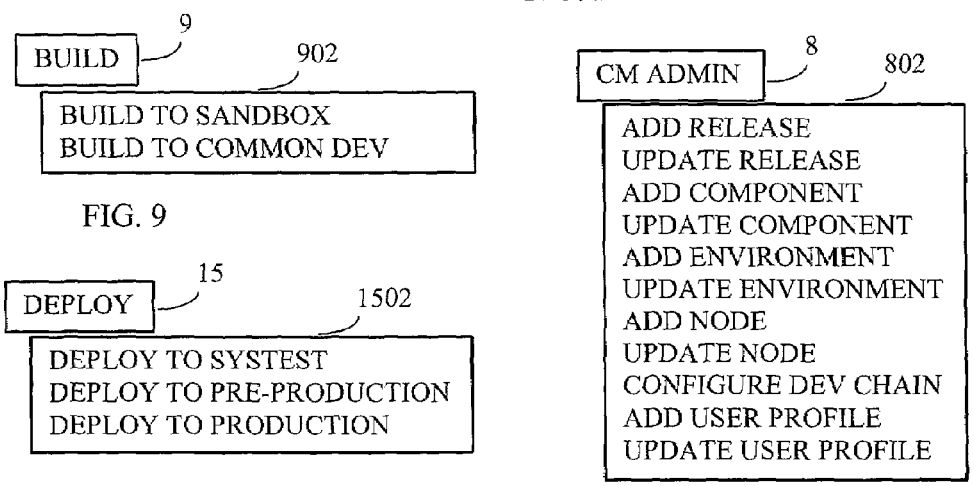
FIG. 9
FIG. 15
FIG. 8

SOFTWARE DEVELOPMENT AND DEPLOYMENT TOOL build | deploy | cm administration | approve | ... | ... | help | log out Logged in as:
Christopher Payne

User Profile Listing

| CUID | User Name | Role | Email |
|---|---|---|---|
| axcha | Achanti, Venkata | Dev | Venkata.Achanti@bellsouth.com |
| txrltn | Allen, Todd | CM | Todd.Allen@bellsouth.com |
| wsrcse | Angle, Michael | Dev | Michael.Angle@bellsouth.com |
| bthdcg | Arnold, Beth | Dev | Beth.Arnold@bellsouth.com |
| vnzknw | Austin, Vanessa | CM | vanessa.austin@bellsouth.com |
| arcckz | Aycock, Aaron | Dev | Aaron.Aycock@bellsouth.com |
| bxrcnv | Bailey, Carla | CM | Carla.Bailey@bellsouth.com |
| brhtwp | Bara, Bob | Dev | Bob.Bara@bellsouth.com |
| rkpjr | Barbrow, Robert | Dev | Robert.Barbrow@bellsouth.com |
| sfcuz | Bass, Scott | Dev | Scott.Bass@bellsouth.com |
| rcklzq | Bassil, Phil | Dev | Phil.Bassil@bellsouth.com |
| wsjthvx | Bean, Allen | QA | Allen.Bean@bellsouth.com |
| bkrsgcz | Beckum, Thomas | Dev | Thomas.Beckum@bellsouth.com |
| brswfc | Behzadi, Negin | QA | Negin.Behzadi@bellsouth.com |
| blxqrl | Bonner, Bridget | Dev | Bridget.Bonner@bellsouth.com |
| lqtrdfz | Bounce, Jeff | Dev | Jeff.Bounce@bellsouth.com |
| svnontq | Bradley, Chuck | Dev | Chuck.Bradley@bellsouth.com |
| bfzvhp | Bradley, Joe | Dev | Joe.Bradley@bellsouth.com |
| nwcnxj | Brookes, Steve | Dev | Steve.Brookes@bellsouth.com |
| tvnkrd | Burns, Robert | Dev | Robert.Burns@bellsouth.com |
| wjutzya | Buster, Perry | Dev | Perry.Buster@bellsouth.com |
| zjnubn | Byrnes, Melissa | Dev | Melissa.Byrnes@bellsouth.com |
| brdfych | Cameron, Dee | Dev | Dee.Cameron@bellsouth.com |
| blvska | Campbell, Cindi | QA | Cindi.Campbell@bellsouth.com |

FIG. 7B

| Data Name | Comments |
|---|---|
| Release Name | This relates to the project name. |
| Release Directory | This is used in NAS 40 applications as the top-level directory under the APPS directory. |
| Release Version | This is the version of the release. |
| SUN Package Base Name | This is a six-character field that ties the different components of a release together. If the component is released as a SUN package, this will be the prefix. The suffixes are three characters and are as follows:<br><br>OBX – Corba servers<br><br>NAS – NAS 40 application server code<br><br>IWS – IWS application server code<br><br>IAS – IAS 6 application server code |
| VOB Source Root | This is the VOB root directory where the project resides (/vob_estore/custebpp) |
| Source Management Type | Current types are ClearCase, and Harvest. |
| Build View | This is the default view used to build this release. Determined by CM. |
| Platform Type | This is the type of platform that an application component executes on. |
| Component Name | This is the name of the smallest build-able unit of a release. A release is made up of one to many components. |
| Component Description | This is a description of the component. It is used in the SUN package description. |
| Build Script Directory | This is the directory within the source manager that the component build script makefile resides. |
| Build Script Name | This is the name of the build script or makefile. |
| Build Script Type | This defines what type the build script is. Currently we have the types:<br><br>GNU makefile<br><br>UNIX shell script |

FIG. 20

| Data Name | Comments |
|---|---|
| Environment Name | Environment is defined as a set of physical servers that an application will execute on. |
| Environment Type | Currently there are 5 environment types:<br>Sandbox<br>Common Development<br>System Test<br>Pre-Production<br>Production |
| Platform Type | This is the platform that describes what a particular node has. |
| Node Name | This is the machine name that is part of the environment. There can be many nodes per environment type. |
| User Name | This is the userID (UID) of the user who has privileges to execute needed commands for this node/platform combination. |
| User Password | This is the password for the above user. |
| Base Directory | This is the root directory structure for the type of platform we are installing on. This is used by the SUN Package utility during the install process. |
| Domain Name | This is the domain name for the current Node. |

FIG. 21

Of Days - used for modification of the build status report; the number of days before today that the user would like search for data on.
Build Log – log file generated during the build/packaging process.
Build Script – mechanism supplied by developers that will compile application specific files.
Build Script Directory – directory where the build script for the component is located.
Build Script Type – type of build script, e.g., GNU Make, UNIX shell scripts.
Component - smallest unit of an application built or deployed individually using the tool.
UID – user identification; usually set up in the operating (e.g., UNIX) environment.
Domain Name – DNS domain that a Node Name is part of.
Date Submitted – date/time that the request was first submitted to the system.
Email Address – used to notify user of status changes during build/deploy/install of application.
Environment – set of machines that an application will execute on, e.g., Sandbox, Common Development, System Test, Pre-Production, and Production.
Environment Chain – environments through which an application has to be approved
First Name – user's first name.
FTP Port – port used when deploying an application to an environment; "0" if not used
Host Computer – See Node Name
iPager Address – user's iPager address; may be used for the notification process.
Last Name – user's last name.
Node – single machine within an environment
Node Name – DNS name of a specific machine within an environment.
Platform – run time environment on which the application runs; e.g., NAS 4.0
Release – combination of the common name of a project combined with the version.
Release Id – production directory that resides under the root directory in NAS 4.0 applications
Release Name – used to reference a project.
Release Version – version of the project/release.
Requestor – name of the user who completed the last action on any given request.
Request Number – number assigned to every build request that goes through the system.
Root User – UID of the user who has start/stop privileges of the application.
Root Password – password for the for the Root User.
Root Directory – base directory where an application will be installed in production environment.
Source Root Directory – top-level directory for the project source files within the source management software.
Source Type – type of source management tool being used.
Source View – ClearCase view used to build a component for a release.
Status – current state of any given request in the Build Status report.
SUN Package Name – base name assigned to SUN package when built; a three-character suffix is added to the base name depending on platform; e.g., IWS, NAS, OBX, IAS
Version – version number of the release.

FIG. 22

SYSTEM AND METHOD FOR A WEB-BASED APPLICATION DEVELOPMENT AND DEPLOYMENT TRACKING TOOL

BACKGROUND

1. Field of the Invention

The present invention relates generally to application software development, configuration management, and deployment. More specifically, the present invention relates to program management software that allows an organization to effectively deploy new or updated software only after the software has been tested for quality and durability.

2. Background of the Invention

Configuration management for development and deployment of application software can be a complex and time-consuming task in environments where software developers are constantly updating software used to support operational business requirements. For example, many organizations today employ large teams of software developers to create and maintain applications needed to maintain a cutting-edge in their respective markets. Oftentimes, there is a need to continually improve or expand the capabilities offered to customers via the applications. In such dynamic software development environments, systems and methods for managing development and deployment of application software can be critical to the success of the organization.

It is common knowledge in the art that software development should follow a few basic principles. For example, it is generally accepted that a requirements phase should be the first step in any software development project. During this phase, the desired functionality of the software is defined and well as its operating environments, timelines for deployment, budgets, and the like. The next phase in a software development process typically involves application developers actually writing code to meet the requirements. In this phase, the developers may consider questions or issues such as the choice of the software development environment, the programming techniques to be implemented, and the like.

Once the application code has been written, it needs to be tested. In many environments, the initial testing is performed by the developers themselves. At some point in the process, the application may be turned over to a quality assurance (QA) group for further testing. The application will be deployed on operational systems only if the code passes QA testing.

While these phases are commonly known to software developers, a problem exists in enforcing the procedures. That is, for a variety of reasons, the new code may not have been fully tested prior to being deployed. For example, if a code change appears simple, the developer may not consider how the change may impact other applications running in the production environment. In other cases, a short deadline may force a developer to deploy software before it has been fully tested. Another problem with managing software configuration may be the sheer number of developers working on a project. The project may be so large that it is broken down into several components, such that each component is independently developed, tested and deployed. In such cases, it becomes a very difficult process to manage each component to ensure that all testing has been accomplished prior its deployment.

Conventional software configuration management applications have been used to track software configuration. Such management applications may be used to determine the versions of software on a system and may be used to track other software development tasks. However, conventional configuration management applications do not include enforceability. That is, such applications may be used to help a manager to track changes to a system. However, applications do not provide a common framework within which developers, testers, and configuration managers can work to manage the entire software development and deployment process.

Another problem with conventional configuration management software is the lack of a user-friendly interface. Many configuration management software is difficult to understand and does not provide high-level visibility into the status of individual software components.

SUMMARY OF THE INVENTION

The present invention solves the foregoing problems associated with conventional software application configuration management and deployment systems by providing a system and method for a web-based software development and deployment tool.

A development and deployment tracking tool according to the present invention allows a software development organization to manage a plurality of software releases. The tool is made up of a series of lists or databases tracking various information related to the software releases and individual software components making up the releases. One list identifies the plurality of software releases, including a release identification and a source type for each release. Another list relates to the individual software components, including information such as a build script and a script type associated with each component. Another list identifies a plurality of application operating environments including an environment type associated with each environment. Another list identifies a plurality of nodes including an environment selected from the environment list. Another list identifies a plurality of users of the development and deployment tool and associates a role defining each user's access rights to the development and deployment tracking tool.

The development and deployment tracking tool includes a user interface for receiving a build request from a user, including information such as a release name, a component name, and a target environment. The user interface allows the user to select the release name, the component name, and the target environment from the entries defined in the respective lists. When a build request is received from a user, the development and deployment tracking tool checks the user list to verify that the user's role allows the request, and the development and deployment tracking tool executes the build script associated with the component, and updates a status associated with the build request. In an embodiment the development and deployment tracking tool sends an email message to one or more users when the build request has been completed.

Examples of environment types include a common development environment, a pre-production environment, a production environment, a sandbox environment, a system test environment, and an undetermined environment type. Examples of roles include a developer, a configuration manager and a quality assurance tester.

An embodiment may include a user interface for receiving a test approval result. The test approval result may be passed via a notification message to one or more users for action. For example, if the component fails a test, the developer may receive a notification indicating the result and providing comments to help identify the problems to be corrected.

BRIEF DESCRIPTION OF THE DRAWINGS

FIG. 2 is a screen shot showing an exemplary view of a user interface that may be used in a development and deployment tracking tool according to the present invention.

FIG. 5 is a screen shot showing an exemplary user interface form for entering application development data to define a new node within the development and deployment tool.

FIGS. 7A and 7B are screen shots showing exemplary user interface forms for entering and updating application development data to define a new user within the development and deployment tool.

FIG. 8 is a schematic diagram showing an exemplary menu choice that may be provided under a "CM Administration" function of the development and deployment tool.

FIG. 9 is a schematic diagram showing an exemplary menu choice that may be provided under a "Build" function of the development and deployment tool.

FIG. 15 is a schematic diagram showing an exemplary menu choice that may be provided under a "Build" function of the development and deployment tool.

FIG. 20 is a table of data elements that may be associated with a software release in an embodiment of the present invention.

FIG. 21 is a table of data elements that may be associated with an application environment in an embodiment of the present invention.

FIG. 22 is a table defining terms used in the present detailed description of the invention.

DETAILED DESCRIPTION OF THE INVENTION

The development and deployment tool described herein provides a framework for managing and enforcing a software application development and deployment process. The tool provides users with a system and method for automating the software builds for each phase of the development and deployment cycle. As known in the art, a software build is the result of the compiling of any necessary code. Developers, configuration managers, quality assurance groups, and others may use the tool to track the status of each individual component of a software application. The tool may be configured to provide different levels of access to different users, depending on the "role" the user is assigned in the system.

As a component moves from one phase to the next within the development and deployment cycle, email notifications may be sent to interested parties. This feature can be used to help keep a project on track by keeping everyone informed as to the status of the project.

As indicated above, the development and deployment tool may also be used to enforce the configuration management (CM) policy for an organization. For example, if the CM policy requires all code to be tested in numerous environments, the tool may be used to graduate the application to each level as it passes the earlier testing levels. If the application fails any of the required tests, the development and deployment tool can be used to send the build back to the developers for corrections.

Because the development and deployment tool is web-based, the user interface may be implemented as a graphical user interface (GUI) to receive needed information from users as required. The GUI may be presented as one or more windows and the windows may comprise one or more forms (also referred to herein as "views") that a user may use to enter and submit data related to an application. Also, as a web-based tool, the system is not limited to any one hardware configuration and may be installed and run, for example, on a UNIX-based server, a Windows NT-based server, or other server system. Similarly, users may access the development and deployment tool from any web browser.

Figure 1A:
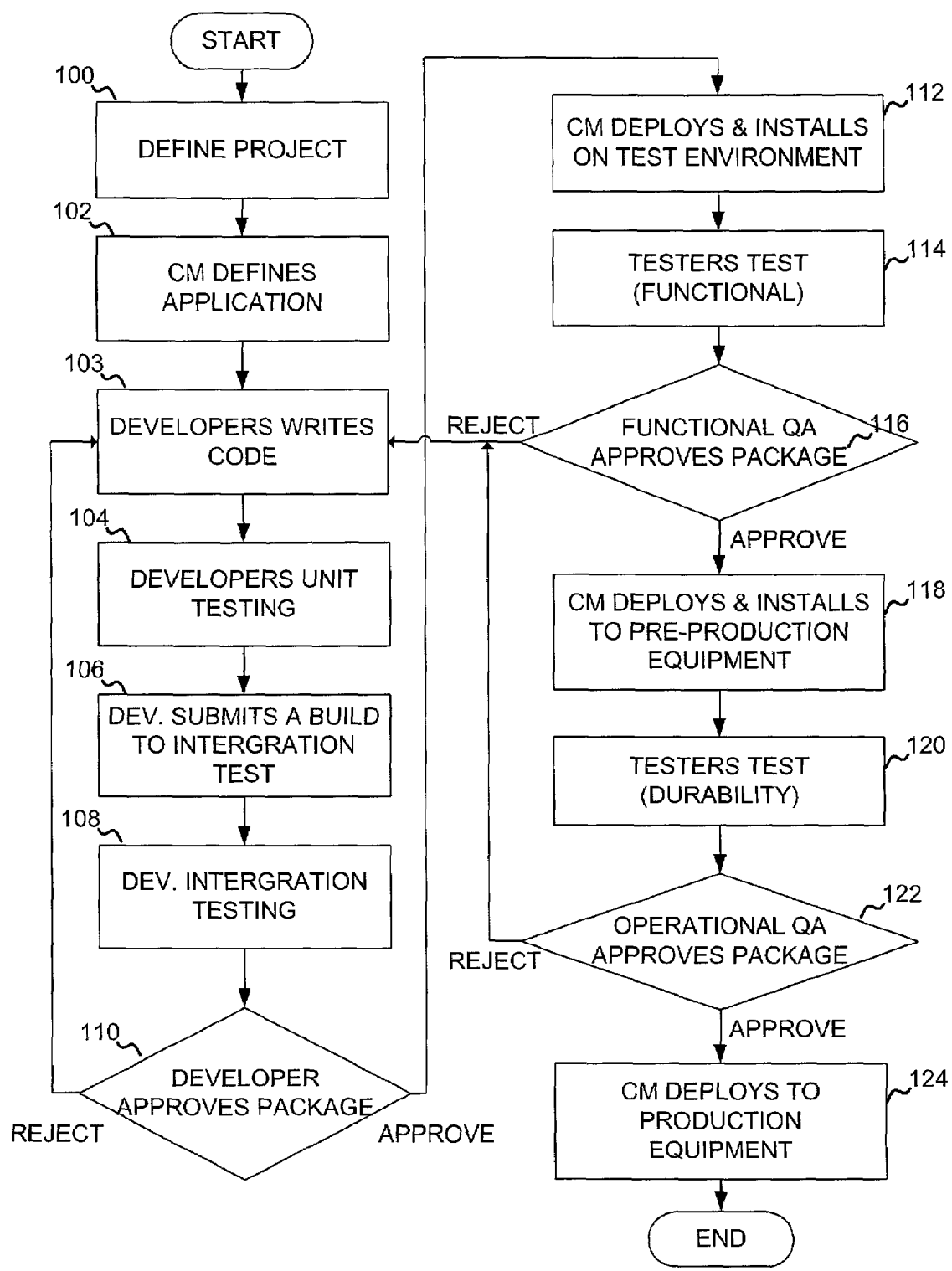
FIGS. 1A and 1B are flow diagrams showing steps that may performed in an embodiment of the present invention.

FIG. 1A is a flow diagram showing the steps that may be performed in an exemplary web-based software development and deployment tool according to the present invention. In step 100, a new project is defined. This step is typically carried out by the business or other functional areas within the organization. During this step, the end-users define what they what want the new (or updated) software application to do. For example, the end-users may want to change an ordering page in a web-based store to use a new contract for interfacing with the back-end systems.

Figure 1B:
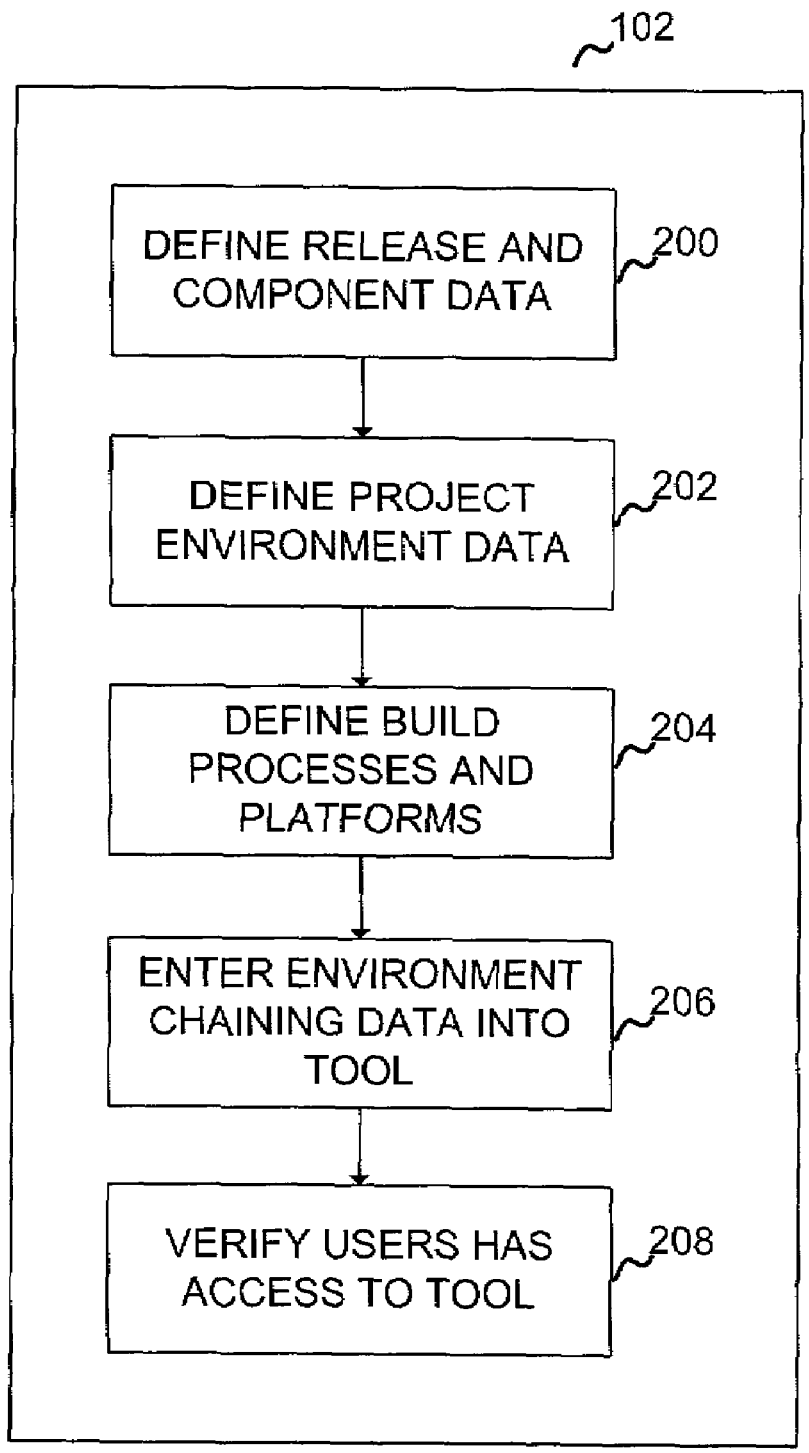

In step 102, the new (or updated) application is defined. In this step, the organization's development and configuration management groups may meet to discuss what is required from the development group. The application definition may include environment definition, release name definition, versioning, build script requirements, and application configuration requirements. This step is preferably done as early in the development process as possible. FIG. 1B is a more detailed flow diagram showing the sub-steps that may be performed in embodiments of the present invention. FIG. 2 is a screen shot showing an exemplary embodiment of a development and deployment tool according to the present invention. FIGS. 3A–19 are screen shots showing an exemplary user-interface that may be implemented in embodiments of the invention to assist users in completing each of the steps in FIGS. 1A and 1B. Tables 1 and 2, shown in FIGS. 20 and 21, respectively, show the data that is used in a preferred embodiment when defining the application within the software development tool. Table 1 shows the data that may be used to define the release and Table 2 shows the data that may be used to define the environment.

Figure 3A:
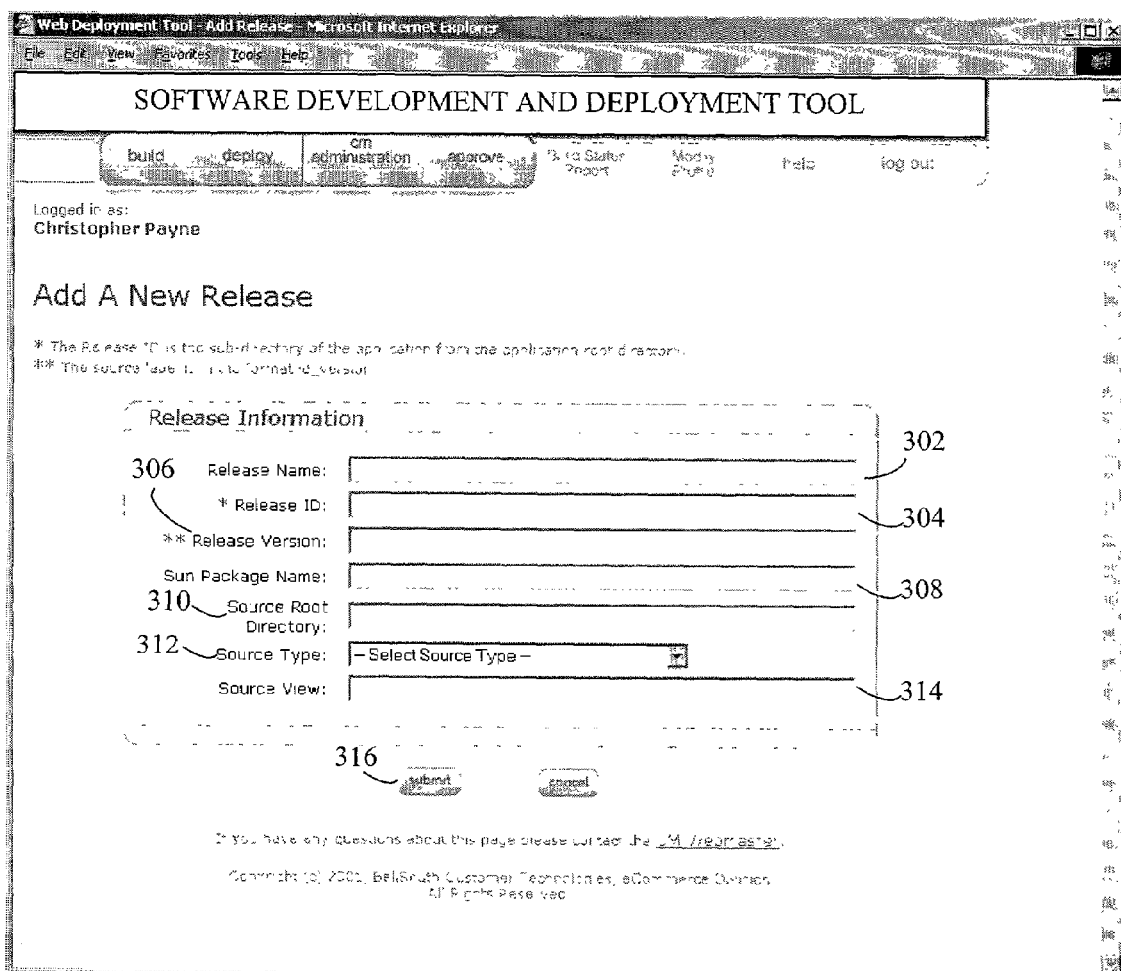
FIGS. 3A and 3B are screen shots showing exemplary user interface forms for entering application development data to define a new release and component.

In step 200, the release and component data for the new application is defined. FIG. 3A shows an exemplary data request screen for completing the first part of this task, that is, the definition of the release data. The view shown in FIG. 3A may be accessed by selecting option button 8 (shown in FIG. 2) to view "CM Admin" drop down menu 802 (shown in FIG. 8) and selecting the "Add Release" menu item. The fields shown in FIG. 3A may be filled in as follows. "Release Name" field 302 defines how the release/project will be identified within the development and deployment tracking tool. "Release ID" field 304 identifies the directory structure underneath the base directory on the production systems. "Release Version" field 306 identifies the release version number. For example, the release version number may have the form: X.X.X, where "X" is an integer. "SUN Package Name" field 308 is only used in certain operating environments. The field may be used to identify the base SUN Package name to be used to any SUN packages to be generated within this release. "Source Root Directory" field 310 identifies the top-level directory for the source code. "Source Type" field 312 identifies the source type, for example, ClearCase, CCC/Harvest, SourceSafe, and the like. "Source View" field 314 is the default view used by the tool to compile any source code for this release. Once the data has been filled in, the user may press "Submit" button 316 to input the information to the development and deployment tracking tool.

Figure 3B:
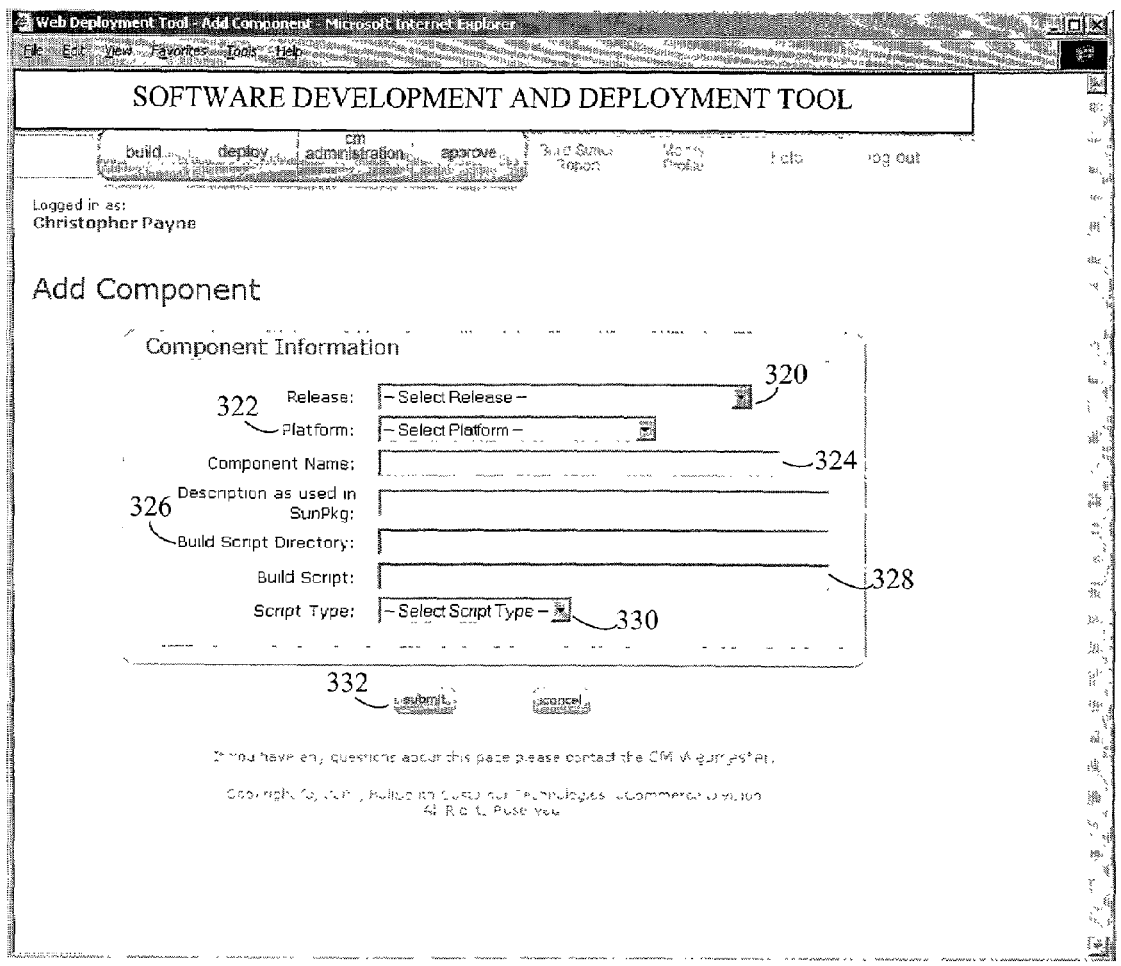

The second half of step 200 is defining the project data. FIG. 3B is shows an exemplary user interface for completing this step. As with the view shown in FIG. 3A, the view shown in FIG. 3B is access by selecting "Add Component" from "CM Admin" menu item 802 (shown in FIG. 8). The user first selects the release from drop-down menu item 320. When this menu is selected, all previously defined releases are provided as options. The user then selects a platform using drop-down menu item 322. The platform is the type of application server. Examples of platforms include, iPlanet Web Server, iPlanet Application Server, BEA Application Server, and the like. "Component Name" field 324 may comprise a derivative of the release name together with a suffix reflecting the platform. Examples of suffixes include, NAS, Cnt, Web, and IAS for the web and application servers. "Build Script Directory" field 326 is the directory where the build script/make file resides to build this component. "Build Script Name" field 328 is the actual name of the build script/make file. "Script Type" field 330 is the type of script being used (for example, UNIX shell script, GNU Makefile, ANT script, and the like). Once the data has been filled in, the user may press "Submit" button 332 to input the information to the development and deployment tracking tool.

Figure 4:
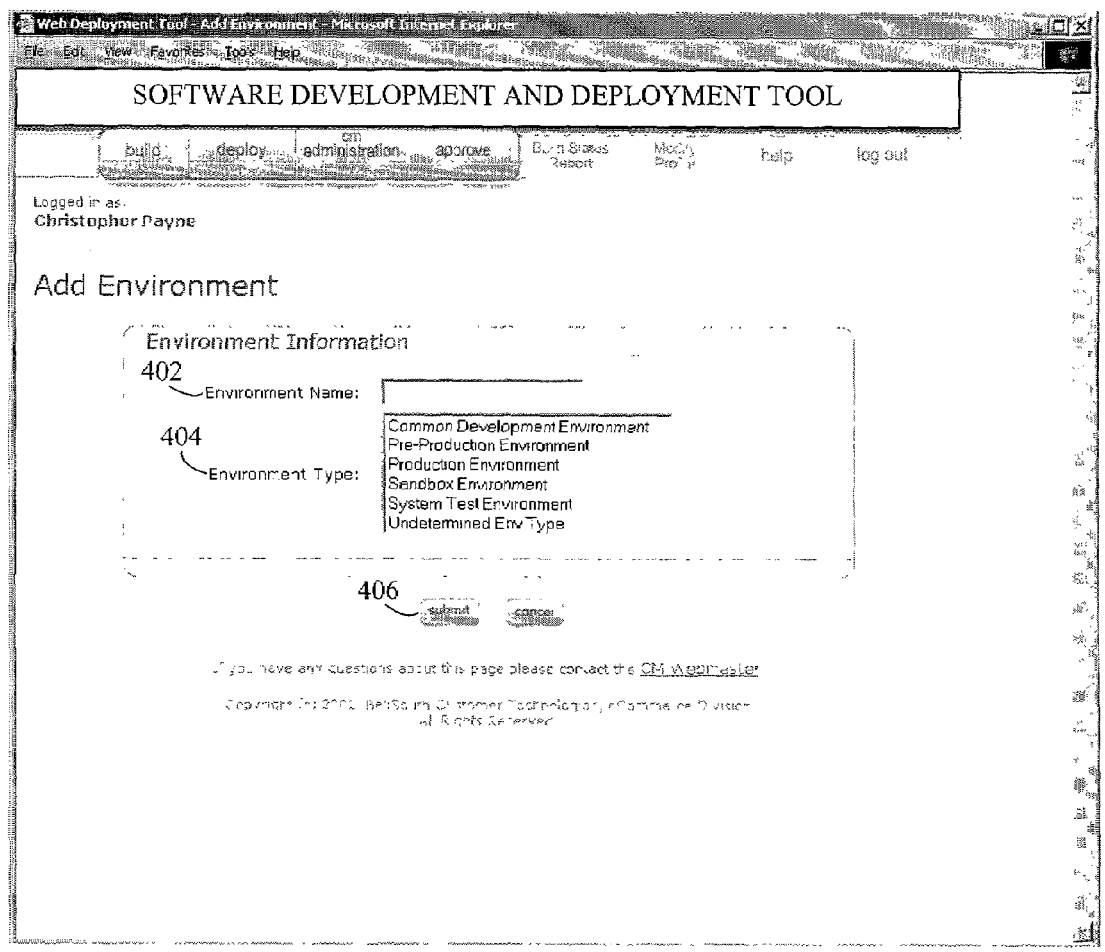
FIG. 4 is a screen shot showing an exemplary user interface form for entering application development data to define a new environment within the development and deployment tool.

In step 202 the project environment data is defined. FIG. 4 shows an exemplary user interface that may be implemented to collect this data from a user. The environment can be thought of as a placeholder that defines a set of machines (or nodes) that a release/application executes on. Each release/application will migrate through a set of environments. Again, this interface may be accessed from "CM Admin" drop down menu 802 by selecting the "Add Environment" menu item. "Environment Name" field 402 should reflect the type of environment and platform that makes up this environment. (e.g., CommonDevNas40). "Environment Type" field 404 provides a list of pre-defined environments that are tracked using the development and deployment tracking tool. Once the data has been filled in, the user may press "Submit" button 406 to input the information to the development and deployment tracking tool.

In step 204, the build processes and platforms are defined. The build script is an integral part of the process to get an application ready to use the tool. In a preferred embodiment, a development and deployment tracking tool provides a developer with multiple options for completing the build script. For example, an embodiment may allow use of a simple Kom shell script; the GNU make utility, and the ANT utility. Preferably, the build script is able to accept arguments that allow the tool to build individual components separate from each other. Also, the build script is preferably capable of using environment variables defined outside itself.

Also in step 204, the build platform (including node data) is defined. The node data is part of the environment data. An environment is defined as a set of nodes that an application executes on. The node data describes these machines, and gives the development and deployment tool information needed for file transfers (FTP), restarts of application servers, and application base directories. When the user selects the "Add Node" menu item from "CM Admin" drop down menu 802, a view such as shown in FIG. 5 may be provided to the user.

When a node is added, the user must bind an environment to the node. "Environment" drop-down list 502 provides a list of pre-defined environments from which to choose for this purpose. The user then selects a platform type, determined by the nodes functionality, from "Platform" drop-down list 504. "Node Name" field 506 is used to identify the node. The field may comprise the hostname of the computer on the network or a nickname used to identify the node. "Host Computer Name" field 508 is the hostname of the computer on the network. "Root User" field 510, "Root Password" field 512, and "Root Directory" field 514 correspond to the user that has the rights to the third-party application's startup and shutdown scripts.

"FTP Port" field 516 may be used if a non-standard port is used by the development and deployment tool. If a standard port is to be used, the field need not be included. "Domain Name" field 518 identifies the domain that the computer resides in. Once the data has been filled in, the user may press "Submit" button 520 to input the information to the development and deployment tracking tool.

Once all of the needed environments are defined, the deployment chain is defined in step 206. A deployment chain is the route of environments that an application must follow on its way from development to production. A simple example of a deployment chain is as follows:

1. An application release is built and deployed to System Test ("systest").
2. Once approved in System Test, the same build would be deployed and installed on a Pre-Production environment.
3. Once approved in Pre-Production, the same build would then be deployed to the Production environment.

Figure 6A:
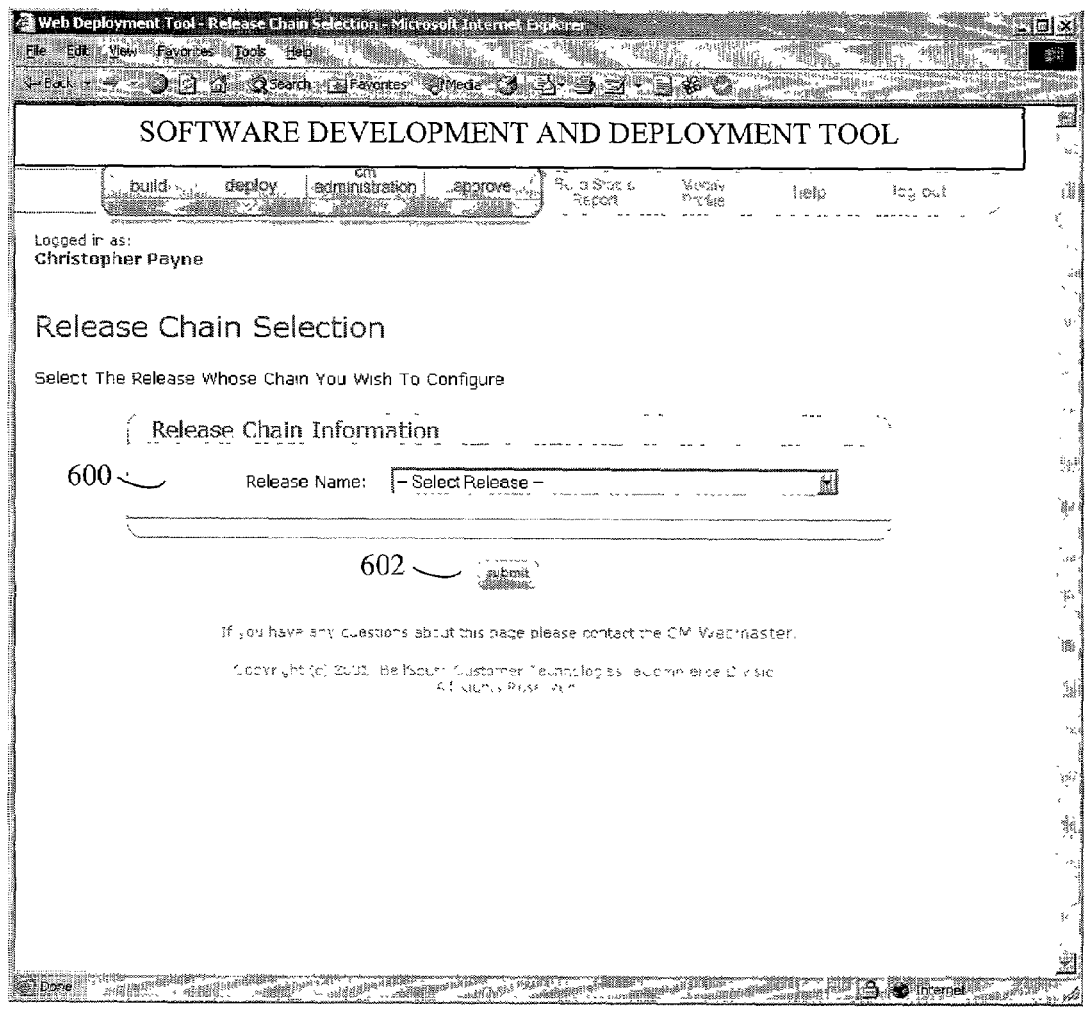
FIGS. 6A and 6B are screen shots showing exemplary user interface forms for establishing an environment chain in an embodiment of the present invention.
Figure 6B:
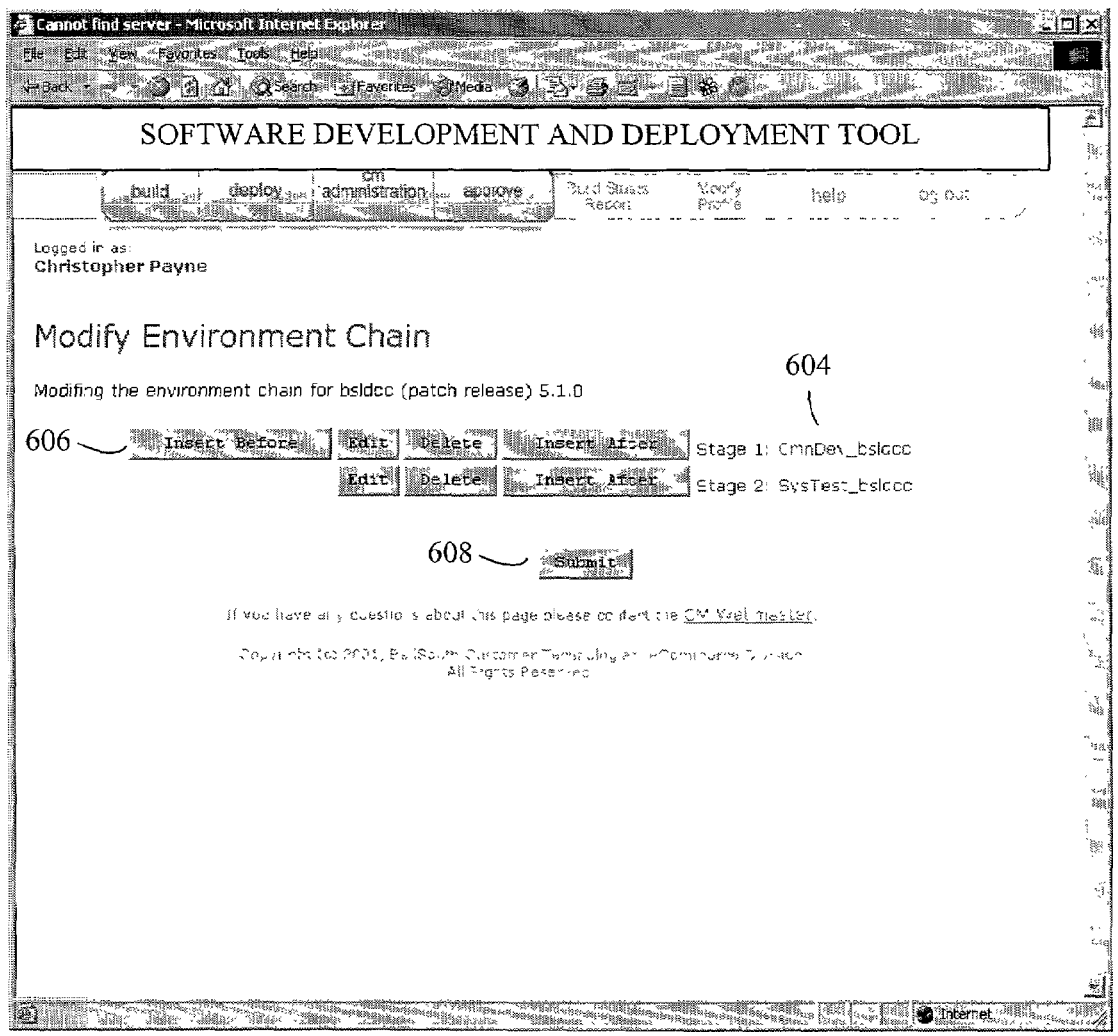

Each environment is defined within the tool. These environments in the development chain may be changed on the fly, to easily accommodate changes in deployment requirements. FIGS. 6A and 6B are screen shots of exemplary forms for creating or updating an environment chain table. A user first identifies the release in dropdown menu 600, then click on submit button 602 to display a form such as shown in FIG. 6B. The current environment chain 604 for the release in this example includes two stages: a common development environment and a system test environment. Using option buttons 606, the user modifies the environment chain to insert other environments before or after those already included in the chain. The user may also delete or edit existing entries in the chain. As before, the user click on submit button 608 to enter the requested changes.

The final sub-step in the application definition phase is step 208, where users are added and/or updated to provide them with access to the development and deployment tool. A user profile may be added to the development and deployment tool by selecting the "Add User Profile" menu item from "CM Admin" drop down menu 802 to display a form such as shown in FIG. 7A.

"CUID" field 702 corresponds to the user's userID on the computer system, while "First Name" field 704 and "Last Name" field 706 correspond to the user's given name and surname. Fields 708 and 710 may be used to enter the user's email interactive pager addresses. These addresses may be used by embodiments of the development and deployment tool to send email notification messages to the user. Field 712 sets the default number days back that a component is displayed on the build request status screen. For example, if it is set to "30" the build request status screen will show components from the preceding thirty days.

Users of the development and deployment tool may be categorized according to the role they have in the development and deployment process. Roles may include, for example, "developer" (DEV), "configuration manager" (CM), "quality assurance" (QA), and the like. Within the development and deployment tool, a user's assigned role determines that user's authorization to perform certain tasks. In a preferred embodiment, a CM role is the highest level. Accordingly, in such embodiments, a user assigned the CM role may perform all of the functions in the system. Drop-down list 714 may be used to identify the new user's assigned role. Once the data has been filled in, the user may press "Submit" button 716 to input the information to the development and deployment tracking tool.

Figure 7A:
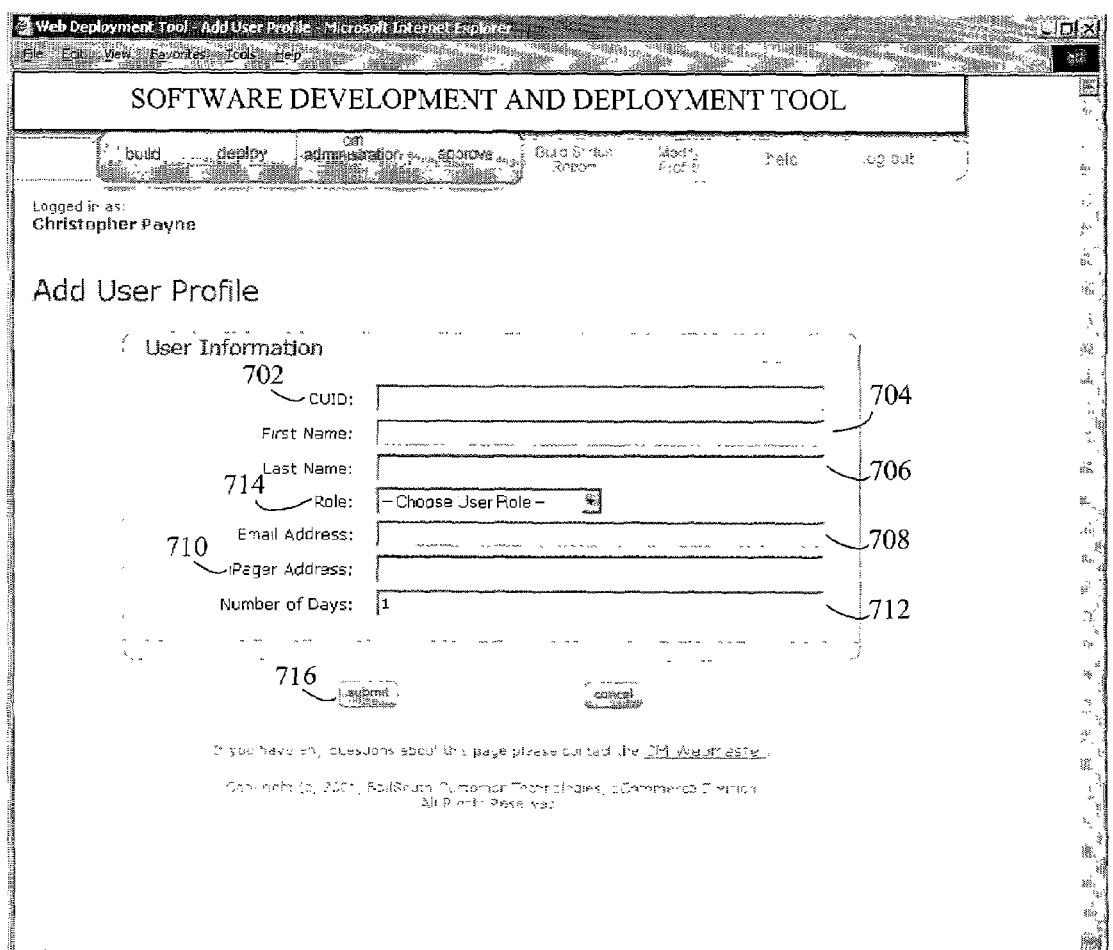

A user profile may be updated in much the same manner by selecting the "Update User Profile" menu item from "CM Admin" drop down menu 802 to display a list of users such as shown in FIG. 7B. Once the user to be updated is selected from this list, a form similar to the form shown in FIG. 7A is provided. Changes are entered and submitted as described above.

Referring back to FIG. 1, the next step in the development and deployment process is step 103, where the software developers actually write the code. This step may include any suitable code-writing techniques and may involve numerous developers in collaboration or a single developer.

Figure 10:
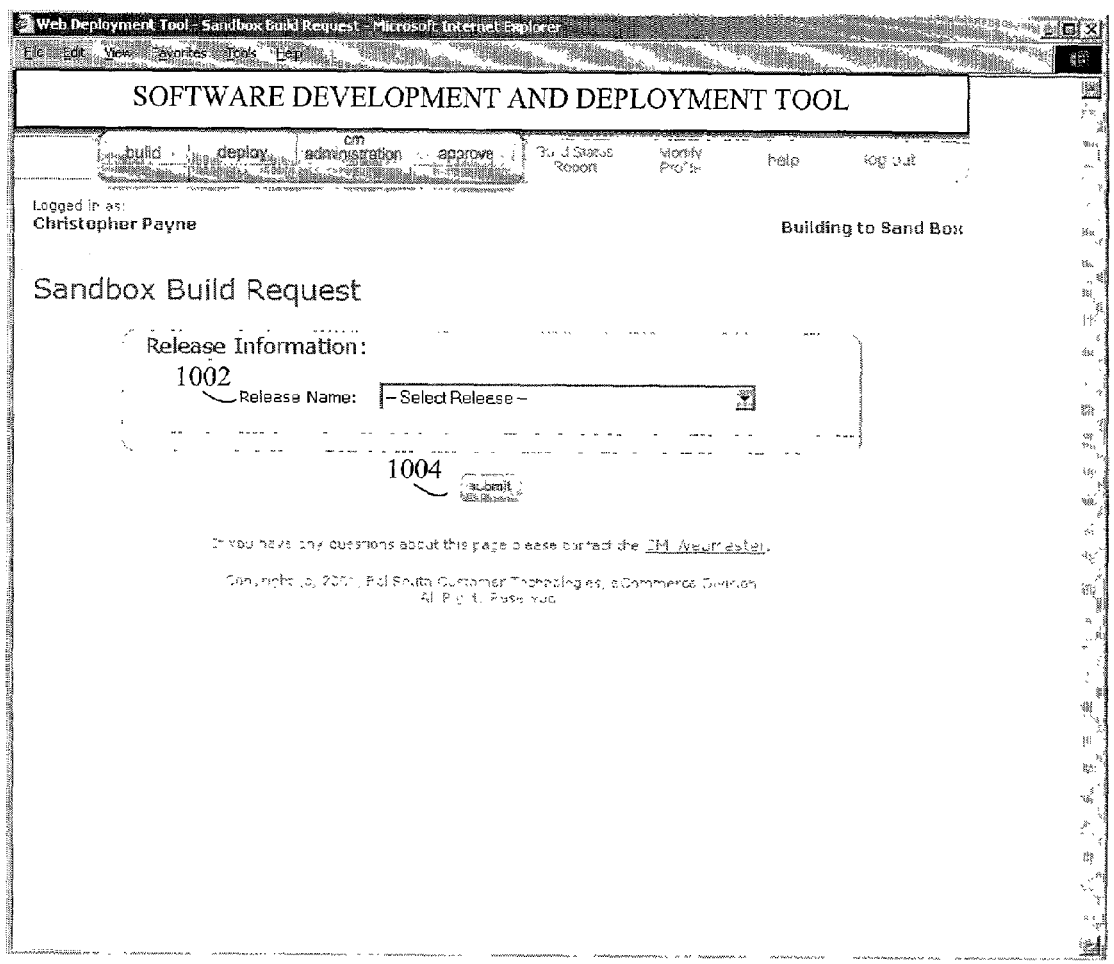
FIG. 10 is a screen shot showing an exemplary user interface form for initiating a sandbox build request within the development and deployment tool.
Figure 11:
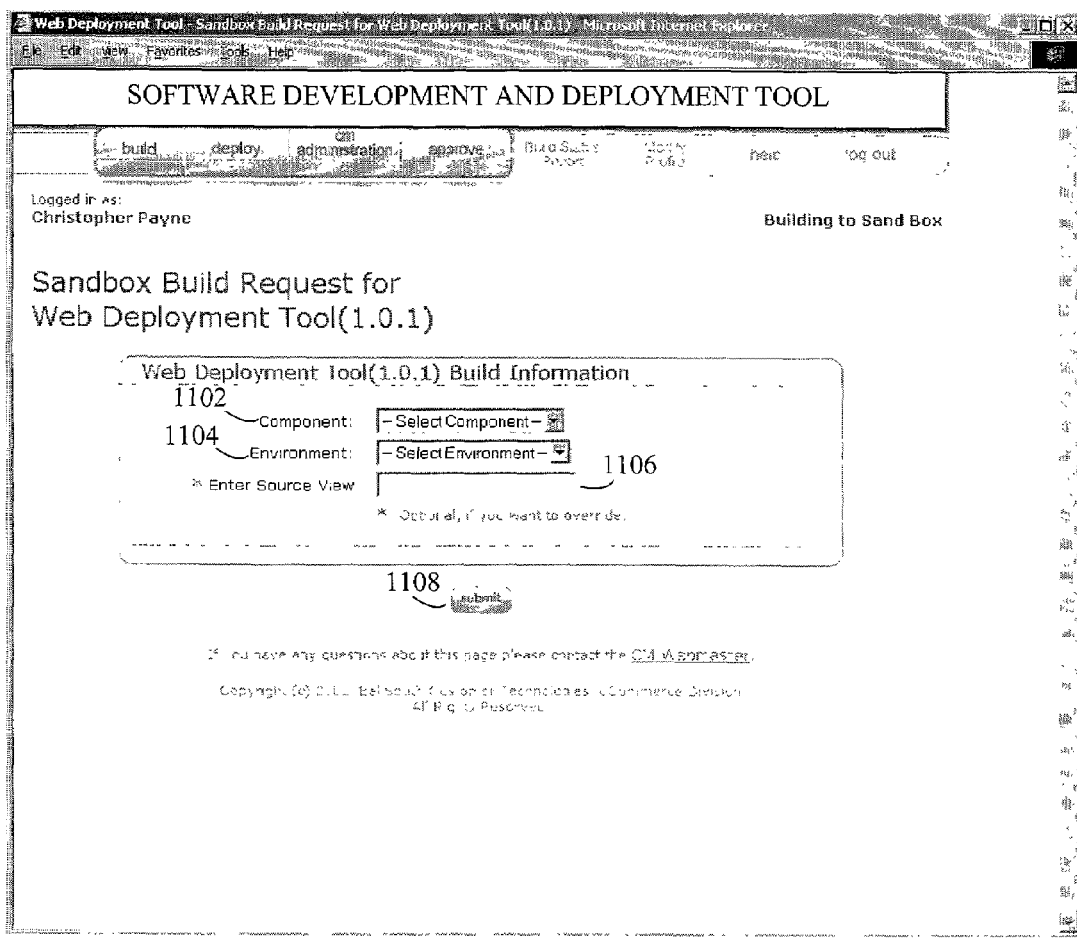
FIG. 11 is a screen shot showing an exemplary user interface form for completing a sandbox build request within the development and deployment tool.

In step 104, the developers unit test the new code to ensure it provides the functionality defined in steps 100 and 102. This testing is generally performed in isolation, that is, the testing goal need not include testing the new code's interaction with other software components. The development and deployment tool is used to create a "sandbox" environment in which to complete this testing. A sandbox environment is a unit testing system allowing a developer to build as many times as he deems necessary without CM assistance. The developer selects "Build" button 9 (shown in FIG. 2) to access "Build" menu 902 (as shown in FIG. 9). The developer then selects "Build To Sandbox" from menu 902 to receive a view such as shown in FIG. 10. The developer then selects the release to be tested in the sandbox via drop-down list 1002 and submits the request via "Submit" button 1004. After submitting the request, additional build information is gathered via a view such as shown in FIG. 11.

Additional build information collected by the development and deployment tool include the component to be tested and the environment in which to perform the testing. This information is entered via drop-down lists 1102 and 1104. Additionally, a new source view may be entered into option box 1106. Again, the developer submits the information using "Submit" button 1108. At this point, the development and deployment tracking tool will compile the necessary code, deploy it to the correct environment and install the software in the environment. The code may be bundled into single file for transport to the environment using suitable file compression tools, such as, for example, a tar utility on a UNIX-based system, a ZIP utility for other operating systems, and the like. The bundled file may then be transferred to the target environment using any suitable file transmission protocol, for example, FTP, copy, and the like. Once the transfer is complete, the development and deployment tool unbundles the files and stores them in the correct directories or folders and makes any system changes needed to complete the installation process.

Once the developer is satisfied with the unit testing of the new application, he must submit the application for testing in an integrated environment in step 106. This testing generally done under the developer's control or the control of the developer's group. This integrated testing environment is also referred to herein as "common development" or "common dev." Building to the common development environment, is the first step in moving a release to production. The common development environment is the first place that application packaging and the application directory structures match those in the production environment. This is also where build rules and CM processes are enforced by the development and deployment tool. That is, once an application component is built to a common development environment, it cannot be built again until the component has a status of "FAILED", "Rejected", or "in Production". In a preferred embodiment, only users assigned a role of "developer" or "CM" may build to a common development environment.

Figure 12:
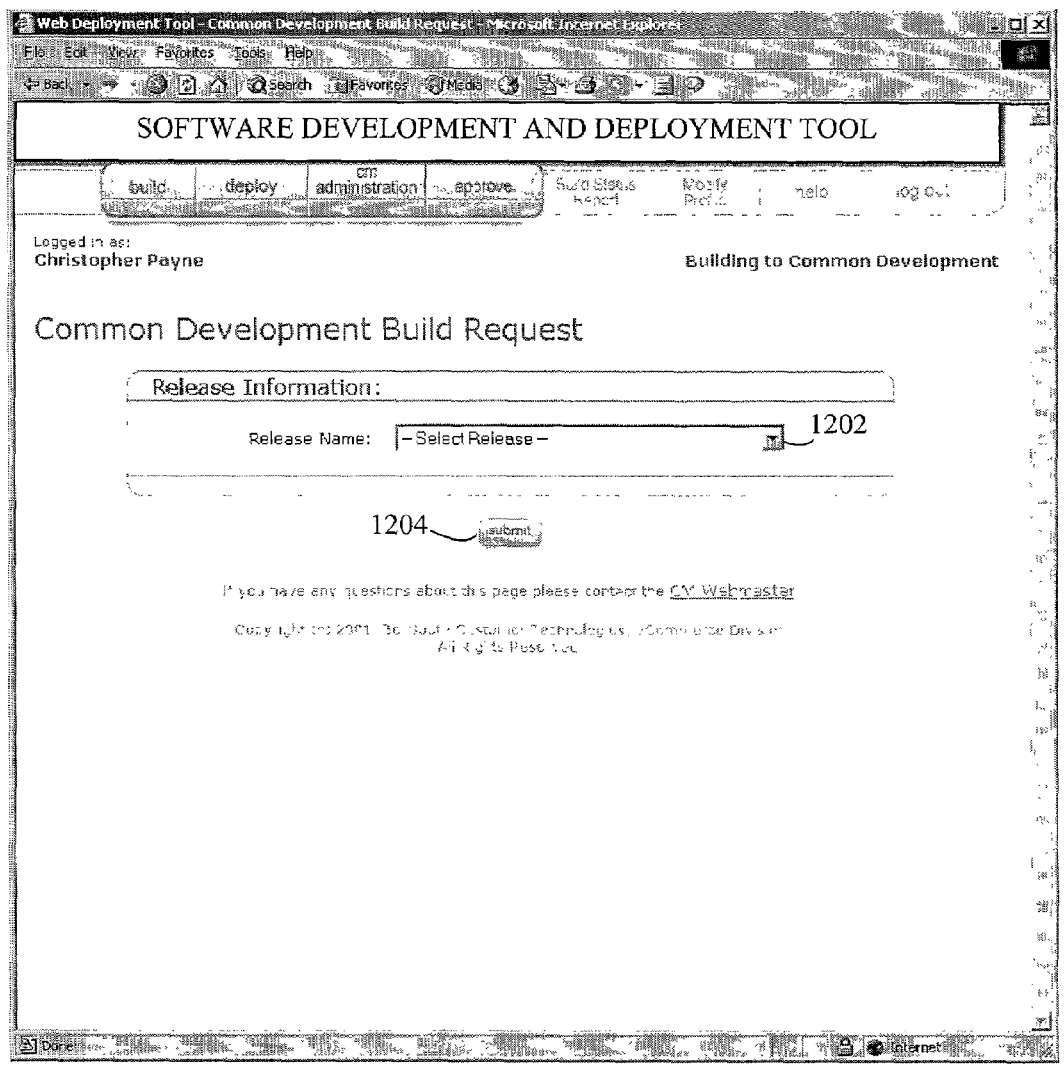
FIG. 12 is a screen shot showing an exemplary user interface form for initiating a common development build request within the development and deployment tool.
Figure 13:
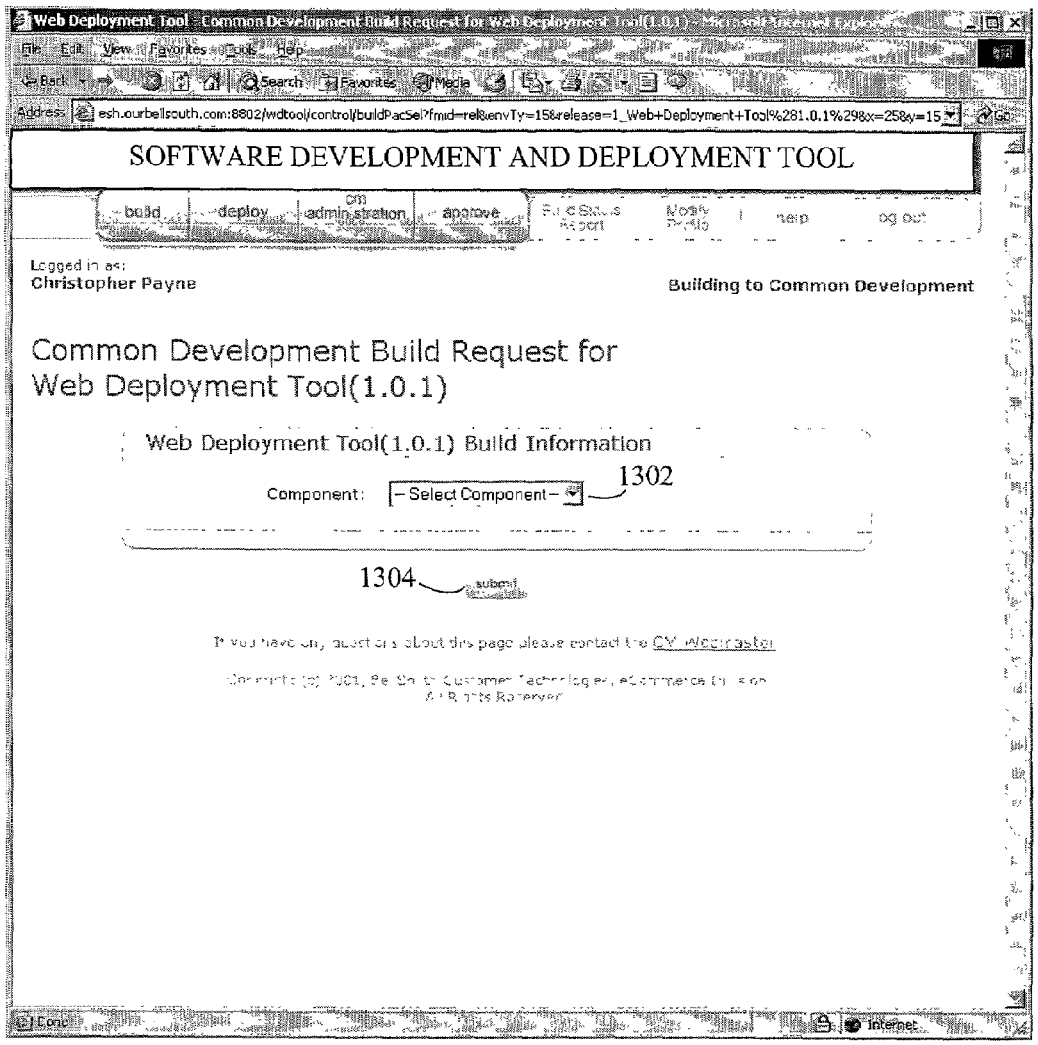
FIG. 13 is a screen shot showing an exemplary user interface form for completing a common development build request within the development and deployment tool.

The development and deployment tool facilitates this step in much the same manner as it facilitates the unit testing (i.e., build to sandbox). That is, the developer selects "Build To Common Dev" from "Build" menu 902 (as shown in FIG. 9). When this option is selected, a view such as shown in FIG. 12 is displayed (this view is similar to that shown in FIG. 10). The developer then selects the release to be tested in common development via drop-down list 1202 and submits the request via "Submit" button 1204. After submitting the request, the component to be tested is selected from drop-down list 1302 in a view such as shown in FIG. 13. Again, the developer submits the information using "Submit" button 1304. Unlike the sandbox build request, when building to the common environment, the user cannot specify an overriding view to use. Similarly, the user cannot change the environment, which is defined in the environment chain table within the tool.

Common development testing is typically conducted by an integration test team. Such a team may consist of QA and development members or only development members.

Because the impacts of multiple simultaneous tests in a single environment may play havoc with testing there is typically a coordination between the teams to make sure everything goes smoothly. The development and deployment tool controls the versions of the code in the common development environment.

Figure 14:
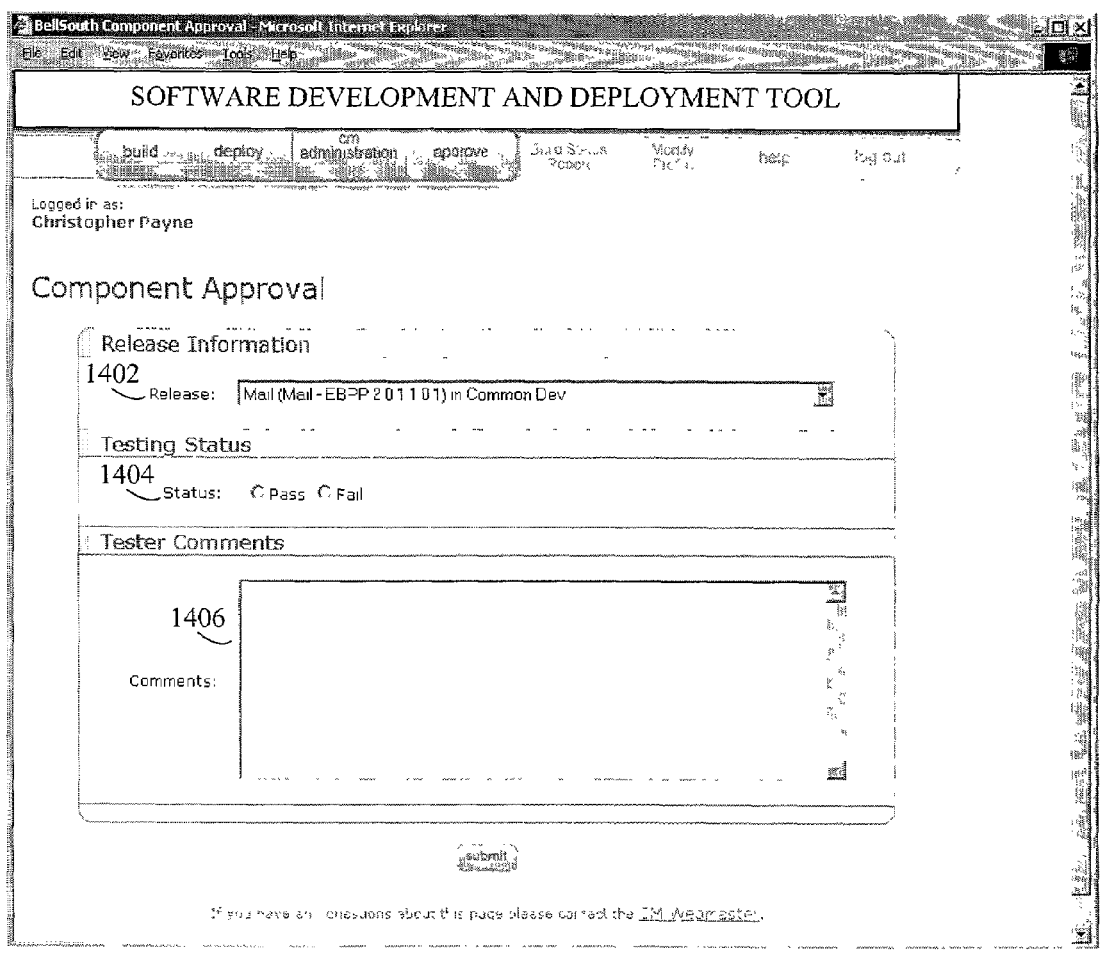
FIG. 14 is a screen shot showing an exemplary user interface form for grading a component within the development and deployment tool.

The integration test team tests the component within the common development environment and "grades" the application with a "pass" or "fail" status in step 110. If the application fails the common development test, the application is sent back to step 103 where the developer corrects any problems. If the application receives a passing grade then configuration management sends the application on for system testing in step 112. Again, the development and deployment tool facilitates these steps by providing an approval process. The evaluator accesses an approval form such as shown in FIG. 14 by selecting button 10 (shown in FIG. 2).

This form is used throughout the development and deployment process to approve or reject a software component that has been placed into a testing status. The evaluator selects the release using drop-down list 1402 and issues the grade via one of status options 1404. Finally, the evaluator may add comments in textbox area 1406. In some embodiments, the comments field may be mandatory in all cases. In other embodiments, the comments field may be mandatory only when the component receives a failing grade or only when the component receives a passing grade. In other embodiments, the comments may be completely optional.

Figure 16:
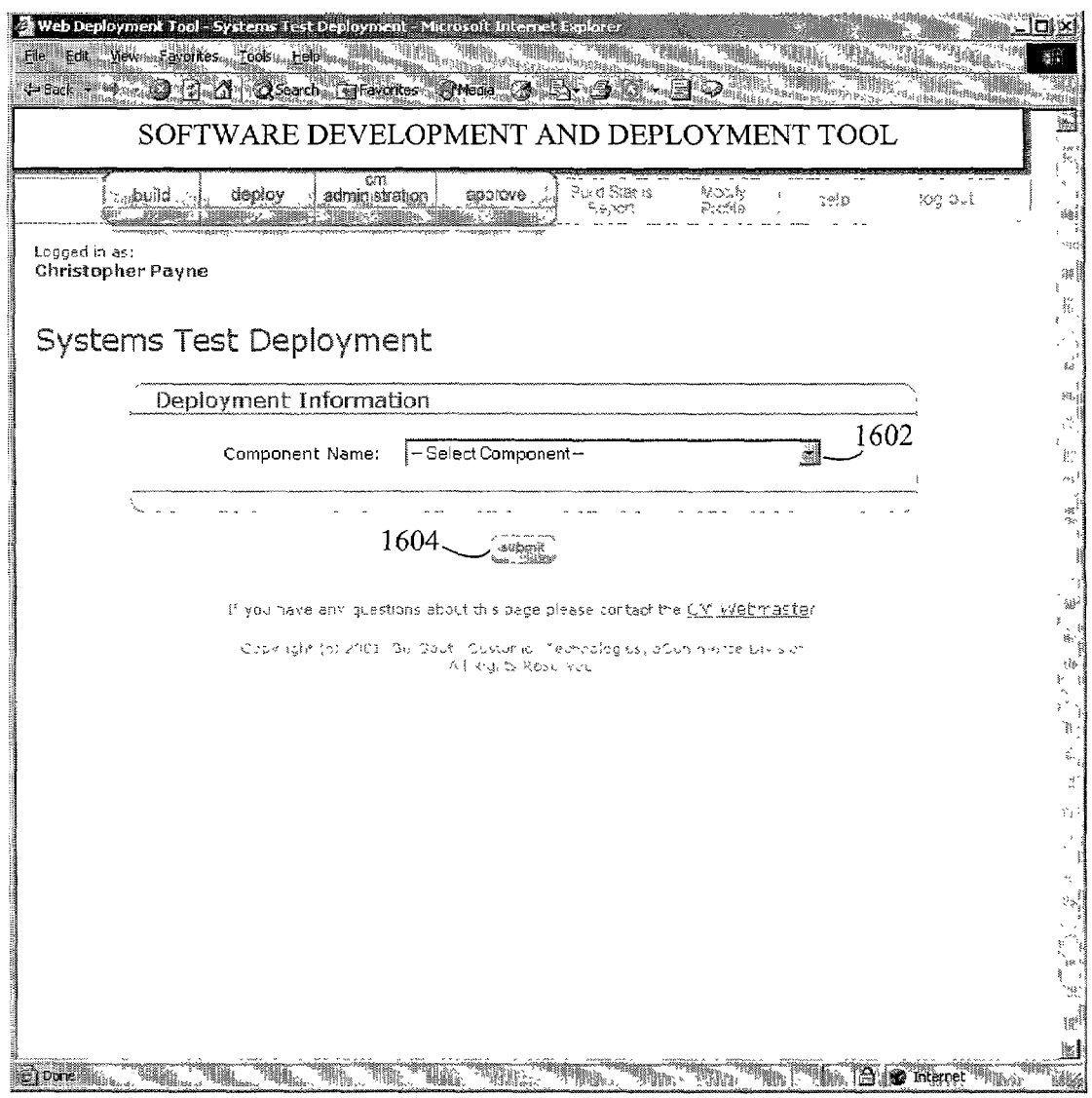
FIG. 16 is a screen shot showing an exemplary user interface form for initiating a system test deployment request within the development and deployment tool.

As described above, if the component is approved the process moves on to step 112 where the application is deployed for system testing. The purpose of the system testing is to check the application for functionality and operability in a test environment. Such testing is typically performed by a quality assurance (QA) group, separate from the development group. The application is deployed to the test system by selecting button 15 (shown in FIG. 2) and choosing option "Deploy to SysTest" from menu 1502 (shown in FIG. 15). When this option is selected, a form such as shown in FIG. 16 is presented to the user. The user then selects the component to be tested in the system test via drop-down list 1602 and submits the request via "Submit" button 1604. Drop-down list 1602 displays all components that are ready and available to be pushed to system test environment. Again, the developer submits the information using "Submit" button 1604.

In step 114 (shown in FIG. 1) the application undergoes system testing to verify the application's functionality as described above. In step 116, the evaluators grade the application's performance using a view such as shown in FIG. 14. If the application fails this testing, it is sent back to the application developers in step 103. Otherwise, the application is ready for deployment to a pre-production system in step 118. In a preferred embodiment, a pre-production system replicates as much of the operational (i.e., production) system as possible. One purpose of testing the application in a pre-production environment is to optimize the performance of the application and to ensure that the application will be durable when it is moved to the operation environment.

Figure 17:
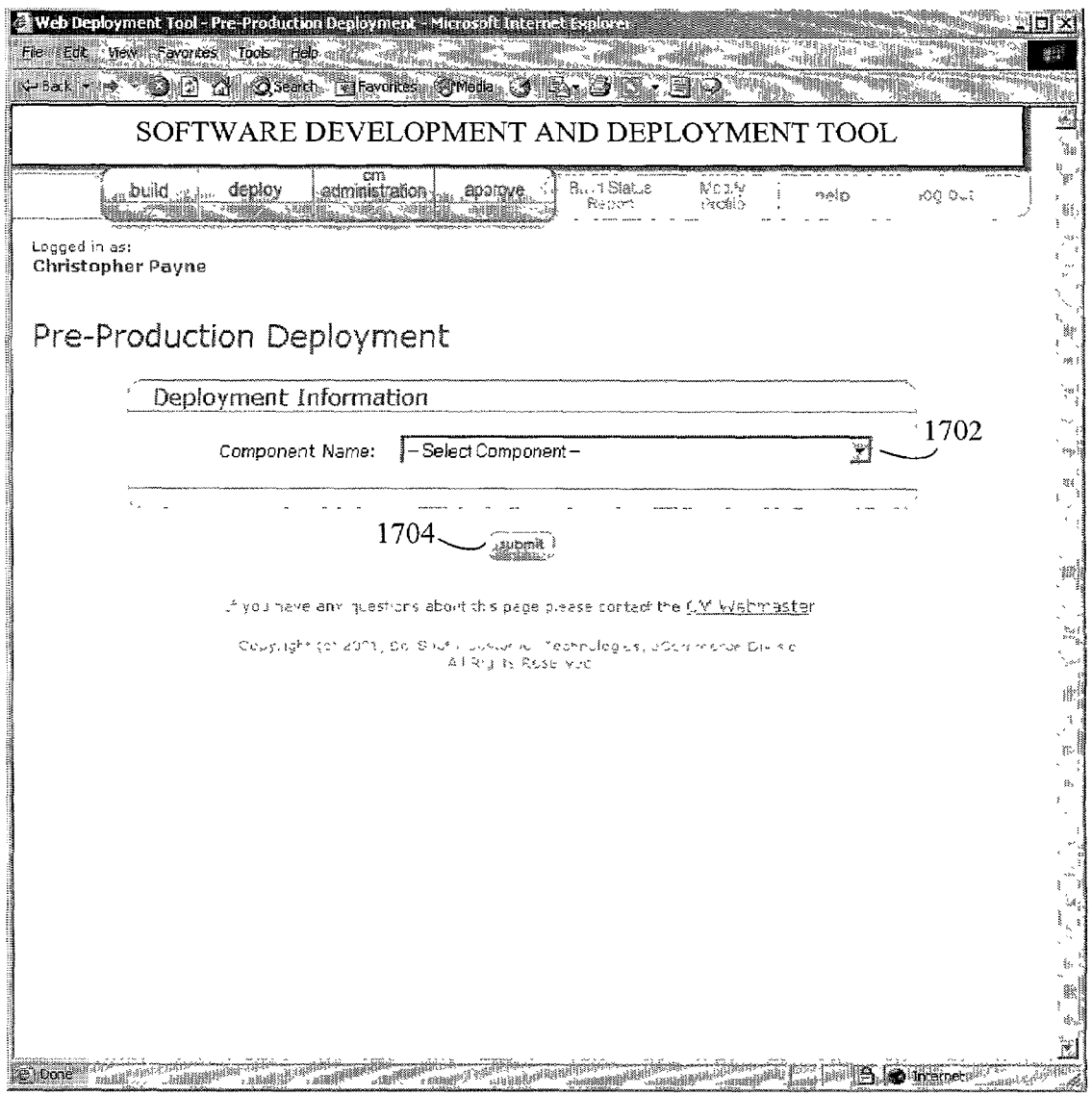
FIG. 17 is a screen shot showing an exemplary user interface form for initiating a pre-production deployment request within the development and deployment tool.

The development and deployment tool is used by the configuration management group to deploy the application to the pre-production system. This is accomplished by selecting button 15 (shown in FIG. 2) and choosing option "Deploy to Pre-Production" from menu 1502 (shown in FIG. 15). When this option is selected, a form such as shown in FIG. 17 is presented to the user. This form is essentially the same as that shown in FIG. 16, except that the component selected in drop-down list 1602 will be built for the pre-production equipment.

In step 120, the new application is tested on the pre-production equipment. In step 122, the evaluators grade the application as described above. If the application passes the pre-production equipment test, the final step is to deploy the application to the production system in step 124. Otherwise, if the application fails the pre-production testing, it is sent back to the application developers in step 103.

Figure 18:
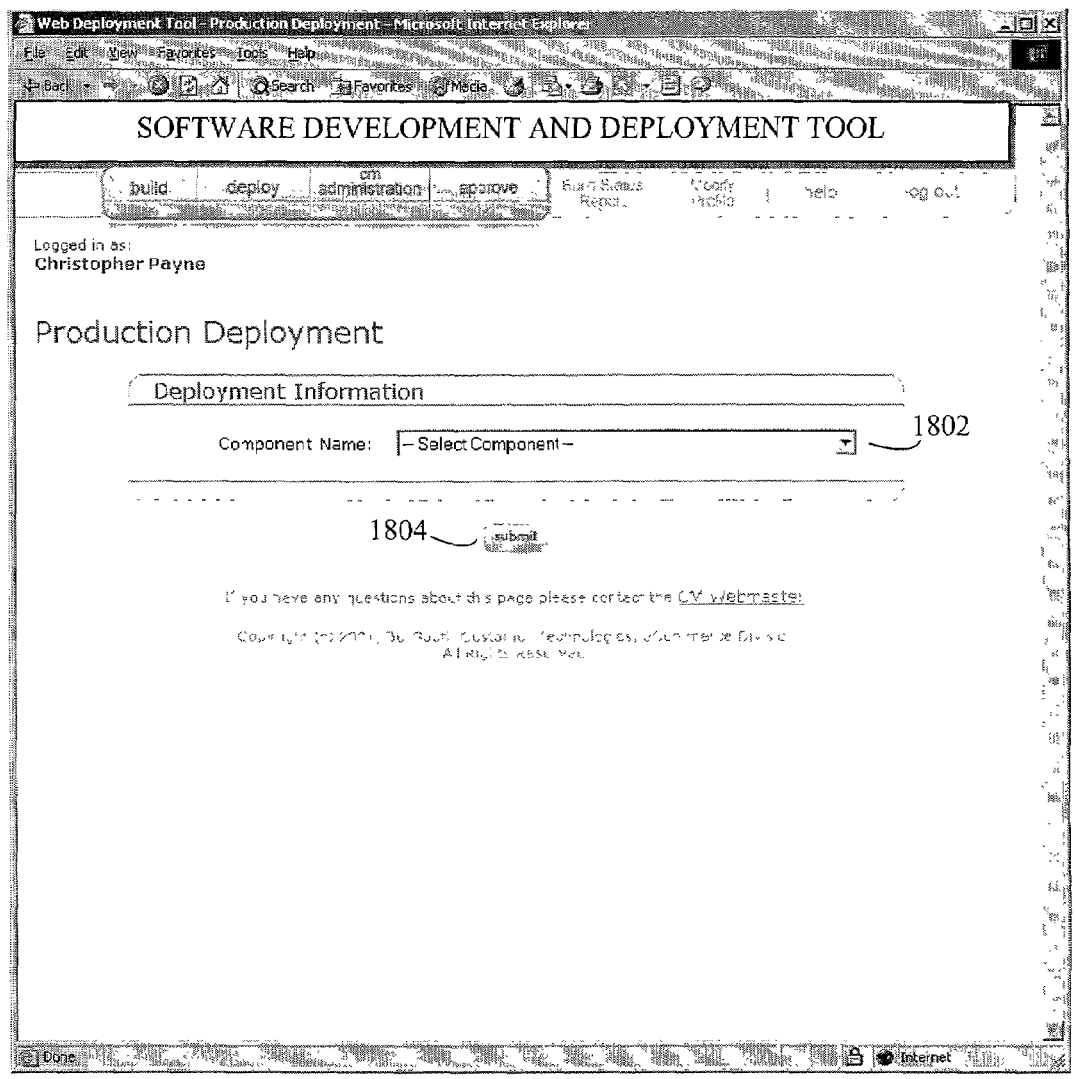
FIG. 18 is a screen shot showing an exemplary user interface form for initiating a production deployment request within the development and deployment tool.

The production deployment is processed by the development and deployment tool in much the same way as previously described herein. That is, a configuration management user selects button 15 (shown in FIG. 2) and chooses option "Deploy to Production" from menu 1502 (shown in FIG. 15). When this option is selected, a form such as shown in FIG. 18 is presented to the user. This form is essentially the same as that shown in FIGS. 16 and 17, except the component selected in drop-down list 1702 will be built for the production equipment.

Other Features in a Preferred Embodiment

A development and deployment tracking tool according to the present invention may include many other features to ease the configuration control and management tasks. For example, the tool may provide status reports or other information that may be customized on demand by individual users. The view shown in FIG. 2 is an example of one such report. In this example, the report is generated when a user selects button 12 (in FIG. 2) to receive "Build Status" information. That report includes several columns of information related to the different components being managed by the tool.

Figure 19:
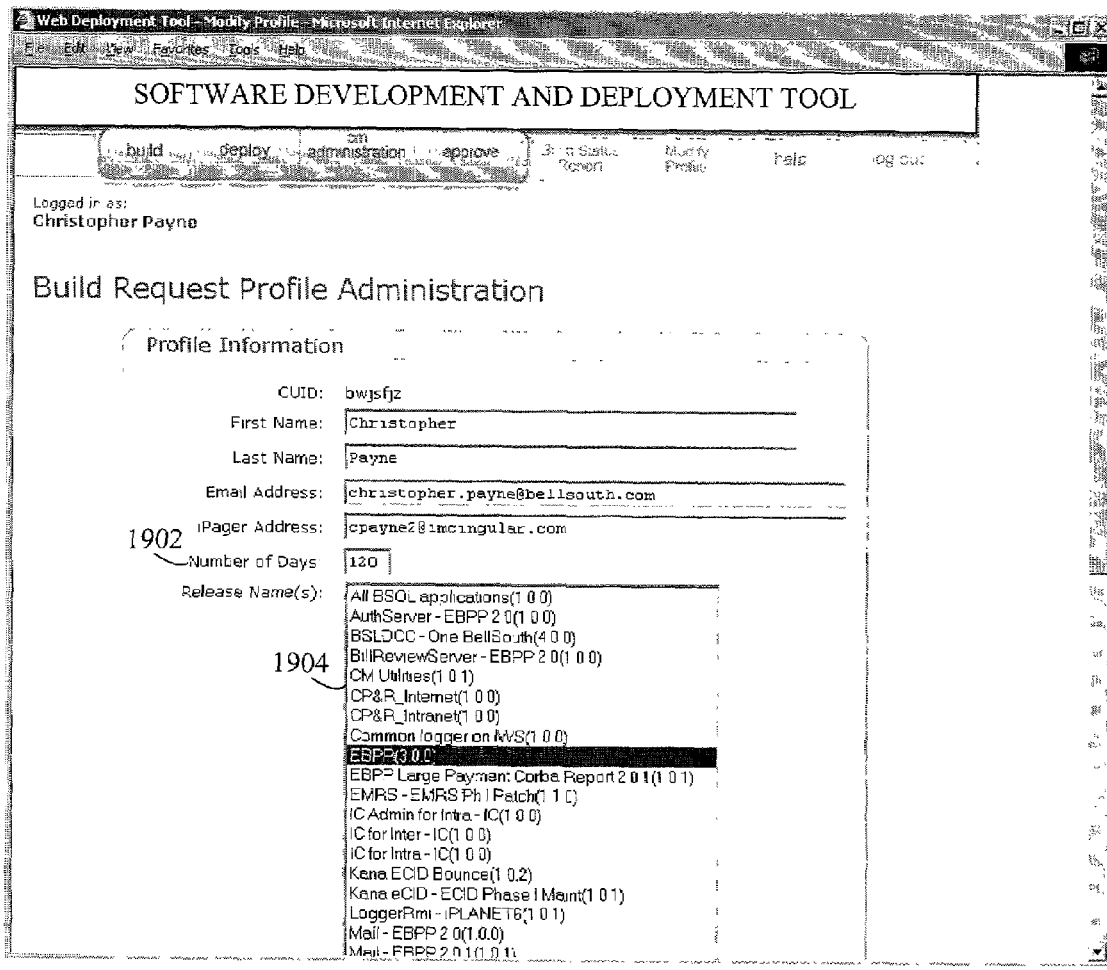
FIG. 19 is a screen shot showing an exemplary user interface form for modifying a build request status report within the development and deployment tool.

Such a report may be customized in this embodiment by selecting button 13 (in FIG. 2) to access the "Modify Profile" function of the tool. A screen such as shown in FIG. 19 will be provided to the user. "Number of Days" textbox 1902 is used to modify the data that the user will see on the "Build Status Report" page. The tool subtracts the number of days in this field from the current date and displays only the requests that have been made within that time frame. "Release Names" multiple select box 1904 allows the user to select which releases should be displayed in the report.

Many of the options available through the Configuration Management Admin button (i.e., button 8 on FIG. 2) have already been described herein. Additional options may be provided allowing a user to update information already stored in the database. For example, forms may be provided to update release data, component data, environment data, node data, and user profiles.

Other features may be included in embodiments of the present invention to simplify maintenance and troubleshooting within the development and deployment tracking tool. For example, the system may include error logs, and other such utilities.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A development and deployment tracking tool for managing a plurality of software releases, said development and deployment tracking tool comprising:
   a first list comprising the plurality of software releases, wherein for each software release, the first list includes a release identification and a source type;
   a second list comprising software components, wherein for each component, the second list includes a build script and a script type;
   a third list comprising a plurality of application operating environments, wherein for each application operating environment, the third list includes an environment type defining a set of nodes on which each application executes, the environment type selected from a common development environment, a pre-production environment, a production environment, a sandbox environment, a system test environment, and an undetermined environment type;
   a fourth list comprising a plurality of nodes, wherein for each node, the fourth list includes an environment selected from the third list
   a fifth list comprising a plurality of users, wherein for each user, the fifth list includes a predetermined role, wherein the predetermined role defines the user's access rights to the development and deployment tracking tool;
   a user interface for receiving a build request from a user, said build request including a release name, a component name, and a target environment, wherein the release name is selected from the first list, the component name is selected from the second list, and the target environment is selected from the third list;
   wherein when a build request is received from a user, the development and deployment tracking tool checks the fifth list to verify that the user's role allows the request, and the development and deployment tracking tool executes the build script associated with the component, and updates a status associated with the build request.

2. The development and deployment tracking tool of claim 1, wherein when the build request is complete, the development and deployment tool sends an email message to a user.

3. The development and deployment tracking tool of claim 1, wherein the role is selected from a group comprising a developer, a configuration manager and a quality assurance tester.

4. The development and deployment tracking tool of claim 1, further comprising a user interface for receiving a test approval result.

5. The development and deployment tracking tool of claim 1, wherein the development and deployment tracking tool sends a message when the build request has been completed.

6. The development and deployment tracking tool of claim 1, wherein the sandbox environment allows testing of software code without assistance from a configuration manager.

7. The development and deployment tracking tool of claim 1, wherein notifications are sent as each component moves between phases.

8. The development and deployment tracking tool of claim 1, wherein if a component fails a test, the component is returned for correction.

9. The development and deployment tracking tool of claim 1, wherein the development and deployment tool is web-based.

10. The development and deployment tracking tool of claim 1, wherein the development and deployment tracking tool includes a user interface.

11. The development and deployment tracking tool of claim 1, further comprising a menu for selecting a platform.

12. The development and deployment tracking tool of claim 1, further comprising a menu for selecting an application server.

13. The development and deployment tracking tool of claim 1, further comprising a menu for selecting a directory where a build script resides.

14. The development and deployment tracking tool of claim 1, wherein the build script is deployed to an environment for installation.

15. The development and deployment tracking tool of claim 1, further comprising a menu for selecting a test system.

16. The development and deployment tracking tool of claim 1, further comprising a status reporting feature.

17. The development and deployment tracking tool of claim 1, further comprising status reporting feature that subtracts a specified number of days from a current date and displays only requests within that time frame.

18. A development and deployment tracking tool for managing a plurality of software releases, said development and deployment tracking tool comprising:
   a first list comprising the plurality of software releases, wherein for each software release, the first list includes a release identification and a source type;
   a second list comprising a software components, wherein for each component, the second list includes a build script and a script type;
   a third list comprising a plurality of application operating environments, wherein for each application operating environment, the third list includes an environment type defining a set of nodes on which each application executes, the environment type selected from a common development environment, a pre-production environment, a production environment, a sandbox environment, a system test environment, and an undetermined environment type;
   a fourth list comprising a plurality of nodes, wherein for each node, the fourth list includes an environment selected from the third list;
   a fifth list comprising a plurality of users, wherein for each user, the fifth list includes a predetermined role, wherein the predetermined role defines the user's access rights to the development and deployment tracking tool;

a user interface for receiving a build request from a user, said build request including a release name, a component name, and a target environment, wherein the release name is selected from the first list, the component name is selected from the second list, and the target environment is selected from the third list;

wherein when a build request is received from a user, the development and deployment tracking tool checks the fifth list to verify that the user's role allows the request, and the development and deployment tracking tool executes the build script associated with the component, and updates a status associated with the build request.

19. A computer readable medium for managing a plurality of software releases, the computer readable medium storing computer readable code for performing the steps comprising:

accessing a first list comprising the plurality of software releases, wherein for each software release, the first list includes a release identification and a source type;

accessing a second list comprising software components, wherein for each component the second list includes a build script and a script type;

accessing a third list comprising a plurality of application operating environments, wherein for each application operating environment, the third list includes an environment type defining a set of nodes on which each software release executes, the environment type selected from a common development environment a pre-production environment, a production environment, a sandbox environment, a system test environment, and an undetermined environment type;

accessing a fourth list comprising a plurality of nodes, wherein for each node, the fourth list includes an environment selected from the third list;

accessing a fifth list comprising a plurality of users, wherein for each user, the fifth list includes a predetermined role, wherein the predetermined role defines the user's access rights to the development and deployment tracking tool;

receiving a build request from a user interface, said build request including a release name, a component name, and a target environment, wherein the release name is selected from the first list, the component name is selected from the second list, and the target environment is selected from the third list;

wherein when a build request is received from a user, the fifth list is checked to verify that a user's role allows the request, and executing the build script associated with the component, and updating a status associated with the build request.

20. A computer readable medium according to claim 19, further comprising computer readable code for defining a deployment chain describing a migration of a software release from one environment to another environment.

* * * * *